(12) United States Patent
Li

(10) Patent No.: US 11,885,129 B2
(45) Date of Patent: Jan. 30, 2024

US011885129B2

(54) CONSTRUCTION PRODUCTS WITH AN ACOUSTICALLY TRANSPARENT COATING

(71) Applicant: USG Interiors, LLC., Chicago, IL (US)

(72) Inventor: Donghong Li, Buffalo Grove, IL (US)

(73) Assignee: USG INTERIORS, LLC., Chicago, IL (US)

( * ) Notice: Subject to any disclaimer, the term of this patent is extended or adjusted under 35 U.S.C. 154(b) by 178 days.

(21) Appl. No.: 15/071,765

(22) Filed: Mar. 16, 2016

(65) Prior Publication Data
US 2017/0268229 A1  Sep. 21, 2017

(51) Int. Cl.
| | |
|---|---|
| E04B 9/04 | (2006.01) |
| E04B 9/00 | (2006.01) |
| C04B 41/00 | (2006.01) |
| D21J 1/08 | (2006.01) |
| C04B 41/48 | (2006.01) |
| C04B 41/63 | (2006.01) |
| D21J 1/20 | (2006.01) |
| B05D 1/02 | (2006.01) |
| B05D 1/18 | (2006.01) |
| B05D 1/28 | (2006.01) |
| C09D 5/00 | (2006.01) |
| C09D 121/02 | (2006.01) |
| C09D 127/06 | (2006.01) |
| C09D 133/08 | (2006.01) |
| E04B 1/86 | (2006.01) |
| C04B 111/00 | (2006.01) |
| C04B 111/52 | (2006.01) |

(52) U.S. Cl.
CPC .............. *E04B 9/0464* (2013.01); *B05D 1/02* (2013.01); *B05D 1/18* (2013.01); *B05D 1/28* (2013.01); *C04B 41/009* (2013.01); *C04B 41/483* (2013.01); *C04B 41/63* (2013.01); *C09D 5/00* (2013.01); *C09D 121/02* (2013.01); *C09D 127/06* (2013.01); *C09D 133/08* (2013.01); *D21J 1/08* (2013.01); *D21J 1/20* (2013.01); *E04B 1/86* (2013.01); *E04B 9/001* (2013.01); *E04B 9/045* (2013.01); *C04B 2111/00603* (2013.01); *C04B 2111/52* (2013.01)

(58) Field of Classification Search
CPC .... B05D 1/28; B05D 1/18; B05D 1/02; C04B 41/4539; C04B 41/009; C04B 2111/52; C04B 2111/00603; C09D 121/02; C09D 5/00; C09D 127/06; C09D 133/08; D21J 1/08; E04B 9/0464; E04B 9/045; E04B 1/86; E04B 9/001
See application file for complete search history.

(56) References Cited

U.S. PATENT DOCUMENTS

| | | | |
|---|---|---|---|
| 1,769,519 A | 7/1930 | King et al. | |
| 3,779,860 A | 12/1973 | Oshida et al. | |
| 5,229,247 A * | 7/1993 | McCarthy | B41M 5/42 430/200 |
| 5,273,824 A | 12/1993 | Hoshino et al. | |
| 5,384,345 A * | 1/1995 | Naton | C08J 5/125 523/218 |
| 6,077,593 A | 6/2000 | Schlachter | |
| 6,103,360 A * | 8/2000 | Caldwell | C09D 5/00 106/401 |
| 6,443,256 B1 | 9/2002 | Baig | |
| 6,531,541 B1 | 3/2003 | Desai et al. | |
| 6,872,761 B2 | 3/2005 | Lestarge | |
| 7,456,245 B2 | 11/2008 | Dunham et al. | |
| 7,754,791 B2 | 7/2010 | Sereboff | |
| 7,763,350 B2 | 7/2010 | Desai et al. | |
| 7,798,287 B1 | 9/2010 | Surace et al. | |
| 8,118,928 B1 | 2/2012 | Yu et al. | |
| 8,210,310 B1 | 7/2012 | Yeung et al. | |
| 8,495,851 B2 | 7/2013 | Surace et al. | |
| 8,590,670 B1 * | 11/2013 | Grube | E04F 15/182 181/294 |
| 8,678,133 B2 | 3/2014 | Clausi et al. | |
| 2005/0167194 A1 | 8/2005 | Arner | |
| 2006/0135709 A1* | 6/2006 | Hasegawa | C08K 5/053 525/474 |
| 2010/0004369 A1 | 1/2010 | Desai et al. | |
| 2010/0129643 A1 | 5/2010 | Yeung | |
| 2010/0273382 A1 | 10/2010 | Nandi et al. | |
| 2010/0279100 A1 | 11/2010 | Heikkila et al. | |
| 2011/0232854 A1 | 9/2011 | Englert et al. | |

(Continued)

FOREIGN PATENT DOCUMENTS

| | | |
|---|---|---|
| EP | 0950646 A1 | 10/1999 |
| EP | 2246397 | 11/2010 |

OTHER PUBLICATIONS

Dow, Ropaque™ Ultra Opaque Polymer, Mar. 2010 (Year: 2010).*
Adamson, Linda et al., Polymeric hiding technologies that make TiO2 work smarter, Jun. 2011, Paint & Coatings Industry (Year: 2011).*

(Continued)

*Primary Examiner* — Cheng Yuan Huang
(74) *Attorney, Agent, or Firm* — Greer, Burns & Crain, Ltd; Philip T. Petti; Brian M. Wishnow

(57) ABSTRACT

Provided is a ceiling tile coated on at least one surface with an acoustically transparent coating which creates pores at the tile surface and comprises a high Tg polymeric binder, titanium dioxide, and particles selected from the group consisting of void latex particles, hollow glass beads, calcium carbonate, calcium magnesium carbonate, calcined clay and any combination thereof. Compositions for acoustically transparent coatings and methods for making a substrate surface acoustically transparent are provided as well.

4 Claims, 4 Drawing Sheets

(56) References Cited

U.S. PATENT DOCUMENTS

| | | |
|---|---|---|
| 2012/0312631 A1 | 12/2012 | Curfman |
| 2014/0196982 A1 | 7/2014 | Clausi et al. |
| 2014/0349534 A1 | 11/2014 | Bologna |
| 2015/0176267 A1* | 6/2015 | Casimiro ................ C04B 26/04 428/313.5 |

OTHER PUBLICATIONS

Rohm&Haas "RopaqueTM Ultra Opaque Polymer" Oct. 28, 2014 (Year 2014).

\* cited by examiner

CONSTRUCTION PRODUCTS WITH AN ACOUSTICALLY TRANSPARENT COATING

FIELD OF THE INVENTION

This invention relates to construction products, including interior acoustical ceiling tiles, with an acoustically transparent coating. This invention also relates to acoustically transparent coatings suitable for applying to a surface where noise reduction is needed.

BACKGROUND

Various ceiling tiles are used in building construction. Such tiles include fiberglass tiles and mineral wool tiles. U.S. Pat. No. 8,118,928 assigned to USG Interiors, LLC, and incorporated herein by reference, discloses a cast ceiling tile prepared with mineral wool, expanded glass beads, starch and stucco. U.S. Pat. No. 6,443,256 assigned to USG Interiors, LLC, and also incorporated herein by reference, provides an acoustical ceiling tile having an improved sound absorption value and having a dual layer of acoustical materials with a low or no mineral wool base mat layer and a high mineral wool overlay surface layer which provides improved sound absorption.

Typically, an acoustical ceiling tile is prepared by one of the following processes. In the water-felting process, a dispersion of mineral wool, lightweight aggregate, binder and other ingredients is flowed onto a moving foraminous support wire for dewatering. After dewatering, the wet mat is dried and cut to the desired panel or tile dimensions.

Acoustical ceiling tiles can also be made by a wet pulp molding or cast process such as described in U.S. Pat. No. 1,769,519. In accordance with this process, a molding composition comprising granulated mineral wool fibers, fillers, colorants and a binder (e.g. starch gel), is prepared for molding or casting the tile. The composition is placed in suitable trays which have been covered with paper or a metallic foil and then the composition is screeded to a desired thickness with a screed bar or roller. A decorative surface, such as elongated fissures, may be provided by the screed bar or roller. The trays filled with the mineral wool composition are then placed in an oven to dry.

One important characteristic of an acoustical interior ceiling tile is its ability to absorb sound and reduce noise in a dwelling. Such sound reduction can be achieved by obtaining a porous ceiling tile in which surface pores absorb and reduce sound transmission. However, it is often desirable to apply a coat of paint over the interior tile. While painting a tile with a coat of paint produces a tile with smooth surface and of desired color, the painting also decreases a number of surface pores, many of which are now filled with the paint. This filling of the pores with the paint may lead to a diminished sound absorption performance, which should be avoided. Thus, there is a need in the art for coatings which are acoustically transparent and which do not diminish significantly sound absorption by an acoustical ceiling tile after it has been painted.

SUMMARY OF THE INVENTION

In one embodiment, the invention provides an interior acoustical ceiling tile coated with an acoustically transparent coating which creates pores on the surface of the tile and which comprises a high Tg polymeric binder, titanium dioxide and particles selected from the group consisting of void latex particles, hollow glass beads, calcium carbonate, calcium magnesium carbonate, calcined clay and any combination thereof. In some embodiments, the particles average from 40 to 150 microns in size.

In some embodiments, the polymeric binder has a glass temperature in the range from about 30° C. to about 150° C., and wherein the void latex particles have a diameter in the range from about 100 nm to about 500 nm. In some embodiments, the polymeric binder is selected from the group consisting of acrylate, vinyl acrylate, polyvinyl acetate, styrene acrylate and any mixture thereof.

In some embodiments, the coating may further comprise at least one filler selected from the group consisting of kaolin, synthetic kaolin, silica dioxide and any combination thereof.

Methods for making an interior acoustical ceiling tile coated with an acoustically transparent coating are provided as well. In these methods, a tile can be prepared by either a wet pulp molding or cast process, and then coated with an acoustically transparent coating comprising a high Tg polymeric binder, titanium dioxide and particles selected from the group consisting of void latex particles, hollow glass beads, calcium carbonate, calcium magnesium carbonate, calcined clay and any combination thereof.

Further embodiments provide an acoustically transparent coating comprising a high Tg polymeric binder in the range from about 30° C. to about 150° C. and particles selected from the group consisting of void latex particles, hollow glass beads, calcium carbonate, calcium magnesium carbonate, calcined clay and any combination thereof, wherein coating is applied to a substrate surface and creates pores at the substrate surface.

DETAILED DESCRIPTION

Figure 1A:
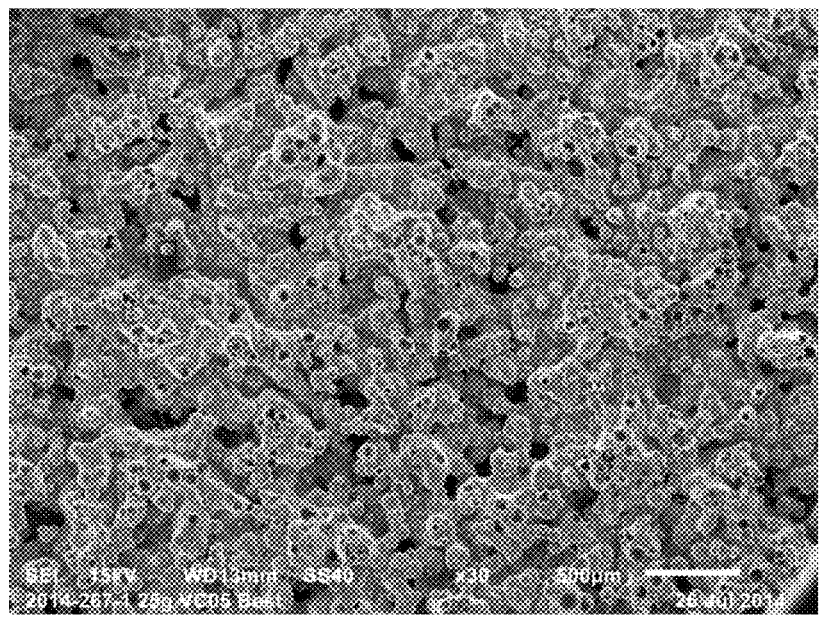
FIGS. 1A-1D provide a comparative structural analysis of a present acoustically transparent coating as shown in FIG. 1A (low magnitude) and in FIG. 1C (high magnitude) and as compared with a conventional coating as shown in FIG. 1B (low magnitude) and in FIG. 1D (high magnitude).

In one embodiment, this invention provides a building construction product such as an interior ceiling tile coated with a coating which is acoustically transparent. In some embodiments, the estimated noise reduction coefficient ("eNRC") that can be achieved by applying the coating to the tile is at least in the range from about 0.80 to about 0.95, at least in the range from about 0.85 to about 0.95, and at least in the range from about 0.90 to about 0.95. In some embodiments, the interior ceiling tile coated with the acoustically transparent coating achieves the eNRC value in the range from about 0.90 to about 0.95. These coated tile products also have a high air flow resistivity which is unexpected, as it was previously conventionally believed that there is a reverse correlation between the eNRC value and air flow resistivity.

The method used in this disclosure for measuring and calculating estimated Noise Reduction Coefficient (eNRC) value is based on ASTM C384 Standard Test Method for Impedance and Absorption of Acoustical Materials by Impedance Tube Method. The instrument is a B&K Pulse System with a large diameter impedance tube. The frequency produced by B&K Pulse System ranges from 50 Hz to 1.6 kHz. To determine the eNRC value, a ceiling tile sample is cut into the correct diameter size to fit the impedance tube of the B&K Pulse System. The instrument generates the usable frequency in the range from 50 Hz to 1.6 kHz. After the ceiling tile sample absorbs the energy, the reflected signals are continually recorded. For each frequency during the testing range, there is a recorded signal value, from 0 to 1, indicating how much sound energy has been absorbed. The value 0 means no sound energy been absorbed, all of the noise was returned back to the test tube, while value 1 means all of the sound energy has been absorbed into the test sample, no noise reflected back.

For the report purpose, the eNRC value is calculated by the following equation:

$$eNRC=[(Value@250\ Hz+Value@500\ Hz+Value@1000\ Hz+Value@1600\ Hz)/4*1.6]/1000$$

where Value@250 Hz is the recorded data under 250 Hz.

It is clearly shown that the eNRC value is calculated by averaging the data under four frequencies (250, 500, 1000 and 1600 Hz). A factor of 1.6 is used for final adjustment. The final eNRC value is in the range of 0 to 1. It might rarely be greater than 1.0 after the factor of 1.6 been put into consideration. The higher the eNRC value is, the better the sound adsorption performance of the ceiling tiles is.

In some embodiments, the acoustically transparent coating comprises a latex binder with high glass transition temperature ("Tg"). Suitable latex binders with high glass transition temperature include those for which the glass transition temperature is in the range from about 30° C. to about 150° C., and more preferably in the range from about 60° C. to about 110° C. At least in some application, a suitable latex binder comprises at least one of the following binders: acrylate, vinyl acrylate, vinyl chloride acrylate, polyvinyl acetate, styrene acrylate and any mixture thereof.

At least in some embodiments of the acoustically transparent coating, a suitable binder has a molecular weight ("Mw") higher than 100,000. At least in some embodiments, a suitable binder has a molecular weight ("Mw") higher than 200,000. At least in some embodiments, the binder can be an acrylic resin emulsion with Mw higher than 200,000 and Tg of about 98° C., including an acrylic resin emulsion with Mw higher than 200,000 and Tg of about 98° C. available under the trade name JONCRYL™ 89 from BASF Corporation, Michigan. Another suitable binder is vinyl-chloride containing acrylic copolymer available under the trade name VINNOL™ 5530U from Wacker Chemical Corporation, Michigan.

In some preferred embodiments for the acoustically transparent coating, a latex binder with high Tg is mixed together with a polymer additive. Suitable additives include void latex particles which can be also referred to as hollow latex particles. In at least some embodiments for the acoustically transparent coating, the void latex particles comprise a water-filled or air-filled core surrounded by a non-film-forming polymeric shell. In some embodiments, the polymeric shell may comprise polystyrene, acrylic latex, or a mixture of polystyrene with acrylic latex. In other embodiments, the shell can be formed from any non-film forming polymer. In some embodiments, the shell comprises a thermoplastic polymer with Tg in the range from 60° C. to about 110° C.

Void latex particles of various diameters are suitable for the acoustically transparent coating. At least some embodiments utilize void latex particles with a diameter in the range from about 100 nm to about 500 nm. At least in some embodiments, the diameter of the void late particles is at least 100 nm, at least 200 nm, at least 300 nm, at least 400 nm or at least 500 nm. At least in some embodiments, the diameter of the void late particles is no larger than 500 nm, no large than 400 nm, no larger than 300 nm, no larger than 200 nm or no larger than 100 nm. At least some embodiments utilize void latex particles with the average diameter size from about 300 nm to about 400 nm. A non-film forming polymeric shell surrounding the core can be of any suitable thickness, including without limitation, about 10 nm, 20, nm, 30 nm, 40 nm, 50 nm, 60 nm, 70 nm, 80 nm, 90 nm or 100 nm.

At least in some embodiments, the shell may comprise two layers made from the same or different polymers. In a two-layer combination, the internal layer surrounds the water-filled core and the external layer surrounds the internal layer. At least in some embodiments, the internal layer is made of polystyrene, while the external layer is made of an acrylic polymer with the Tg of the shell polymer may be, for example, from 60° C. to 140° C. Methods for obtaining void latex particles is described in U.S. Pat. No. 5,273,824, the entire disclosure of which is incorporated herein by reference. Suitable void latex formulations include a void latex material with a particle size of about 380 nm and available under the trade name ROPAQUE™ ULTRA from Dow Chemical Company, Michigan. Suitable void latex formulations also include a void latex material with a particle size of about 350 nm and available under the trade name CELOCOR™ from Arkema Coating Resins, Inc., North Carolina.

In some embodiments for the acoustic transparent coating, a polymeric latex binder with high Tg is mixed with void latex particles. Is some embodiments, the ratio of the binder to the particles is in the range from about 1:3 to about 3:1, respectively. Without wishing to be bound by the theory, it is believed that after the acoustically transparent coating is applied over a ceiling tile, water from the void latex particle core evaporates. This results in a coating with air-filled voids. Unexpectedly, the present coating formulations prepared with void latex particles provide excellent acoustical transparency and absorb and reduce noise very well.

As shown in Table 1 below, when a ceiling tile is coated with at least one coat of an acoustically transparent coating comprising a high Tg latex binder and void latex particles in the ratio 1:3, respectively, the tile absorbs noise well, as shown by eNRC of 0.85.

TABLE 1

Noise Reduction in a Ceiling Tile Coated With a Coating Comprising Void Latex Particles in the Ratio 1:3

|  | eNRC | Air Flow Resistivity (Pa * s/m$^2$) | LR (Light Reflectance) |
| --- | --- | --- | --- |
| 21 g 2 coats | 0.85 | 26,400 | 0.892 |
| 24 g 2 coats | 0.81 | 24,967 | 0.892 |
| 28 g 1 coat | 0.90 | 47,867 | 0.919 |
| 32 g 2 coats | 0.87 | 41,633 | 0.924 |

As also shown in Table 1, the reduction in the noise level is improved further when two coatings of the acoustically transparent coating are applied over the ceiling tile. This result is highly unexpected because painting an acoustical tile with a conventional paint fills in voids in the tile and decreases its noise absorption properties. As also shown in Table 1, the acoustically transparent coating also surprisingly improves air flow resistivity, which before this disclosure conventionally believed to be in reverse correlation with the noise reduction coefficient.

In Table 1 and for the rest of this disclosure, the eNRC values were measured based on ASTM C384 Standard Test Method for Impedance and Absorption of Acoustical Materials by Impedance Tube Method, and as described in detail at the beginning of the detailed description section.

In Table 1 and for the rest of this disclosure, the method used for measuring and calculating airflow resistivity is based on ASTM C522 Standard Test Method for Airflow Resistance of Acoustical Materials. The modified airflow resistivity test measures an airflow rate and a pressure differential for a specimen that has air passing through it. This data is used to measure the airflow resistance, specific airflow resistance, and the airflow resistivity of the material being tested. The airflow resistance of the specimen is calculated using the following equation:

$$R=P/U$$

where R is the airflow resistance, P is the measured pressure differential and U is the airflow rate. Typically, P is expressed in units of Pa, U is expressed in units of $m^3/s$, and R is expressed in terms of $Pa-s/m^3$ or mks acoustic ohms.

The specific airflow resistance can be calculated using the airflow resistance and the area of the test specimen, as shown below:

$$r=SR=SP/U$$

where r is the specific airflow resistance and S is the area of the test specimen exposed to the air source. Typically, S is expressed in units of $m^2$ and r is expressed in units of Pa-s/m or mks rayls.

The airflow resistivity of the specimen can be calculated using the specific airflow resistance value and the thickness of the specimen, as shown below:

$$r_0=r/T=SR/T=SP/TU$$

where $r_0$ is the airflow resistivity of the material and T is the thickness of the test specimen. Typically, T is expressed in units of m and $r_0$ is expressed in units of $Pa-s/m^2$ or mks rayls/m.

Generally, the material's airflow resistivity shows a certain relationship to its estimated Noise Reduction Coefficient (eNRC) value.

In Table 1 and for the rest of this disclosure, the method used for measuring light reflectance (LR) is based on ASTM E1477 Standard Test Method for Luminous Reflectance Factor of Acoustical Materials by Use of Integrating-Sphere Reflectometers. The light reflectance (LR) is a measure of the percentage of visible light that is reflected from a surface. The range is from 0-1. The higher the value is, the whiter the surface's appearance is. Typically, the LR value can be directly obtained from the measurement. The colorimeter will show the LR value on the computer screen. Generally, the higher LR value can be achieved by increasing coating usage on the ceiling tile surface, but this approach impacts negatively the acoustical performance when a conventional paint is used. Therefore, a balance between the estimated Noise Reduction Coefficient (eNRC) value and light reflectance (LR) need to be found by carefully designing a coating formulation and coating application rate.

As shown in Table 1, a ceiling tile coated with at least one coat of an acoustically transparent coating comprising a high Tg latex binder and void latex particles provides a good eNRC value, while still maintaining high LR and air flow resistivity values.

In one embodiment, the invention provides a ceiling tile coated on at least one surface with a coating composition comprising a high Tg polymeric binder and void latex particles. The binder in the coating may be in the amount from 4 wt % to 40 wt %, from about 5 wt % to about 25 wt %, from about 5 wt % to about 15 wt %, of the solids content of the coating composition. The void latex particles may be in the amount from about 75 wt % to about 25 wt %, and more preferably from about 70 wt % to about 50 wt %, of the solids content of the coating composition. The coating compositions may further comprise at least one other component selected from pigments, fillers, thickeners, water retention agents, dispersants, biocides, foaming agents, and other additives.

The ceiling tile is prepared by any method known to a person of skill from granulated mineral wool fibers and a binder such for example, starch, and further optionally includes a filler, colorant and any other additives customary used in production of ceiling tiles. Such ceiling tiles include those made from fiberglass, mineral wool and any combination thereof.

A person of skill will appreciate that a ceiling tile has the face surface facing inside of a room after installation and the back surface facing outside the room. At least in some embodiments, the acoustically transparent coating is applied on the face surface of the ceiling tile. At least in some other embodiments, the acoustically transparent coating is applied on the back surface of the ceiling tile, or on both surfaces, the face surface and the back surface.

Other embodiments of the acoustic transparent coating comprise a higher Tg polymeric binder and hollow glass beads. Suitable hollow glass beads include those which have large diameters such as the diameter in the range from about 50 microns to about 150 microns. At least in some embodiments, the hollow glass beads have an average diameter in the range from about 60 microns to about 70 microns. Suitable hollow glass beads include those with an average diameter of 65 microns and available under the trade name 3M™ glass bubbles K1 from 3M, Inc., Minnesota. The hollow glass beads can be used in various amounts. At least in some embodiments, the hollow glass beads are used in the amount from about 2 wt % to about 20 wt %, of the solids content of the coating composition.

Figure 1B:
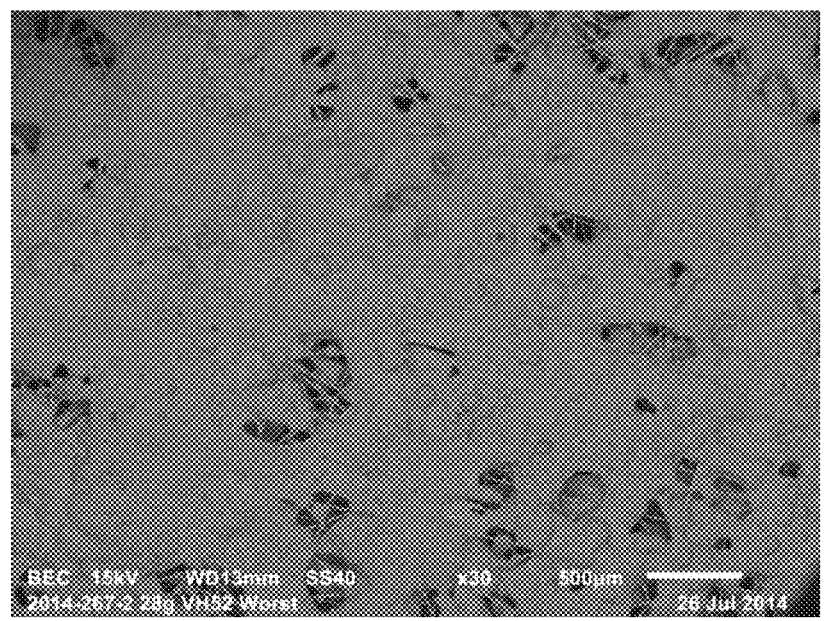
Figure 1C:
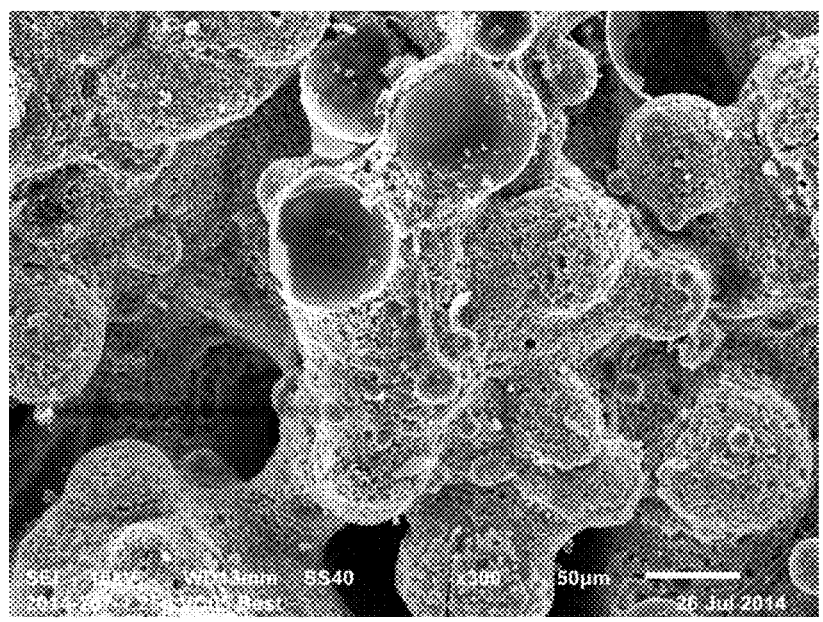
Figure 1D:
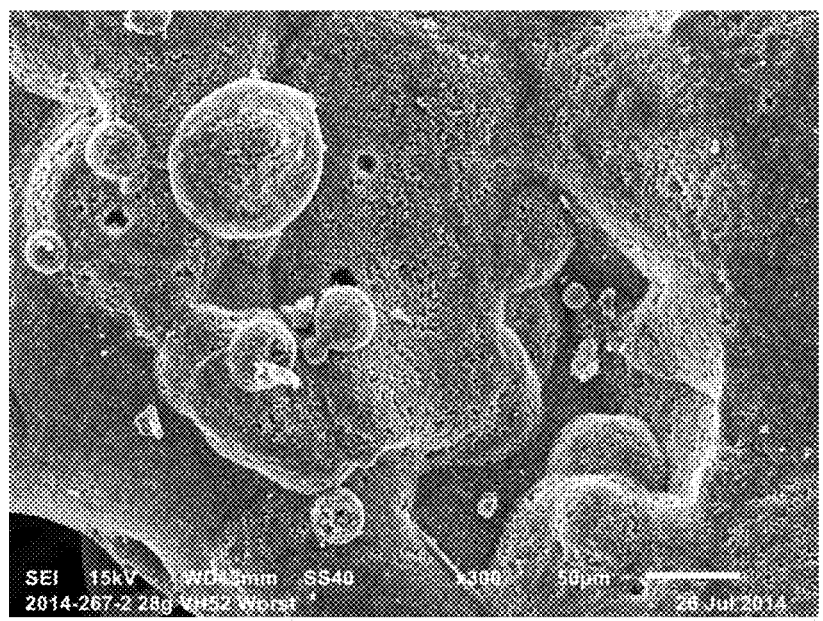

FIGS. 1A-1D are images obtained by scanning electron microscopy. FIG. 1A is a low resolution image with 30× magnification and FIG. 1C is a high resolution image with 300× magnification for the inventive acoustically transparent coating comprising hollow glass beads. FIG. 1B is a low resolution image and FIG. 1D is a high resolution image for a conventional coating which does not comprise hollow glass beads. As can be appreciated from FIG. 1A and especially from FIG. 1C, the inventive acoustically transparent coating creates pores at the surface of the substrate to which it is applied, while the convention coating produces a smooth surface with no pores. Without wishing to be bound by the theory, it is believed that one of the technical advantages of an inventive coating composition is its ability to create pores and a rough surface with voids after the coating has solidified at the substrate surface. This feature is important for noise reduction because a conventional coating which creates a smooth surface after it solidifies does not absorb sound and diminishes the sound-absorbing property of a ceiling tile.

In further embodiments for an acoustically transparent coating, this coating is formulated with a high Tg polymeric binder, hollow glass beads, titanium dioxide, and at least one filler. Various fillers can be used. Fillers with particles ranging in size from 10 to 200 microns are particularly preferred. At least in some embodiments, a filler with particles up to 200 microns can be used instead of hollow glass beads. Filler particles used in the inventive acoustically transparent coating formulation are larger in size than filler particles used in a conventional coating. Suitable fillers include those selected from calcium carbonate, calcium magnesium carbonate, sand, calcined clay, kaolin, synthetic kaolin, glass beads and any combination thereof. Some preferred embodiments include any of these fillers or any combination of these fillers with particles of the average size of at least 10 microns, at least 15 microns, at least 20 microns, at least 25 microns, at least 30 microns, at least 35 microns, at least 40 microns, at least 45 microns, at least 50 microns, at least 55 microns, at least 60 microns, at least 65 microns, at least 70 microns, at least 75 microns, at least 80 microns, at least 85 microns, at least 90 microns, at least 95 microns, at least 100 microns, at least 105 microns, at least 110 microns, at least 115 microns, at least 120 microns, at least 125 microns, at least 130 microns, at least 135 microns, at least 140 microns, at least 145 microns, at least 150 microns, at least 155 microns, at least 160 microns, at least 165 microns, at least 170 microns, at least 175 microns, at least 180 microns, at least 185 microns, at least 190 microns, at least 195 microns, or at least 200 microns. Calcium carbonate with small particles such as smaller than 10 microns is not preferred as a filler. In some embodiments, calcium carbonate with particles smaller than 10 microns is omitted from an acoustically transparent coating formulation.

Surprisingly and in contrast to conventional formulations which typically utilize fillers with small particles, a filler in at least some embodiments of the acoustically transparent coating comprises large particles in the range from 10 to 200 microns.

Some embodiments include calcined clay with particles of the average size of at least 10 microns, at least 15 microns, at least 20 microns, at least 25 microns, at least 30 microns, at least 35 microns, at least 40 microns, at least 45 microns, at least 50 microns, at least 55 microns, at least 60 microns, at least 65 microns, at least 70 microns, at least 75 microns, at least 80 microns, at least 85 microns, at least 90 microns, at least 95 microns, at least 100 microns, at least 105 microns, at least 110 microns, at least 115 microns, at least 120 microns, at least 125 microns, at least 130 microns, at least 135 microns, at least 140 microns, at least 145 microns, at least 150 microns, at least 155 microns, at least 160 microns, at least 165 microns, at least 170 microns, at least 175 microns, at least 180 microns, at least 185 microns, at least 190 microns, at least 195 microns, or at least 200 microns.

Some preferred embodiments include a combination of hollow glass beads and calcined clay with particles of the average size of at least 10 microns, at least 15 microns, at least 20 microns, at least 25 microns, at least 30 microns, at least 35 microns, at least 40 microns, at least 45 microns, at least 50 microns, at least 55 microns, at least 60 microns, at least 65 microns, at least 70 microns, at least 75 microns, at least 80 microns, at least 85 microns, at least 90 microns, at least 95 microns, or at least 100 microns, at least 105 microns, at least 110 microns, at least 115 microns, at least 120 microns, at least 125 microns, at least 130 microns, at least 135 microns, at least 140 microns, at least 145 microns, at least 150 microns, at least 155 microns, at least 160 microns, at least 165 microns, at least 170 microns, at least 175 microns, at least 180 microns, at least 185 microns, at least 190 microns, at least 195 microns, or at least 200 microns.

A person of skill will appreciate that "the average size" refers to a diameter of at least 60% of the particles in a population examined. Fillers can be used in any amounts such as from about 2 wt % to about 50 wt %, such from 5 wt % to 45 wt %, from 5 wt % to 40 wt %, from 10 wt % to 30 wt %, from 15 wt % to 20 wt %. At least in some embodiment, a filler can be used in the amount of about 10 wt %, of the solids content of the coating composition.

Some preferred embodiments include a combination of large hollow glass beads with large calcined clay particles. As shown in table 2 below, an acoustically transparent coating comprising a high Tg binder, hollow glass beads and calcined clay performs well in absorbing sound.

TABLE 2

Noise Reduction in a Ceiling Tile Coated With a Coating Comprising Hollow Glass Beads and Calcined Clay.

| | eNRC | Air Flow Resistivity (Pa * s/m$^2$) | LR (Light Reflection) |
|---|---|---|---|
| 24 g 2 coats | 0.85 | 30,333 | 0.882 |
| 24 g 2 coats | 0.87 | 34,133 | 0.895 |
| 28 g 2 coats | 0.90 | 39,933 | 0.906 |
| 30 g 2 coats | 0.88 | 35,700 | 0.900 |
| 34 g 2 coats | 0.87 | 38,800 | 0.908 |

Further embodiments include an acoustically transparent coating formulation comprising a high Tg polymeric binder, void latex particles, hollow glass beads, titanium dioxide and a clay filler. In these formulations, the high Tg polymeric binder and void latex particles can be used in the ratios from 1:3 to 3:1, respectively. The total amount of hollow glass beads can be in the range from about 2 wt % to about 15 wt %, of the solids content of the coating composition. The total amount of calcined clay in the composition can be in the range from about 2 wt % to about 15 wt %, of the solids content of the coating composition. As shown in Table 3 below, an acoustically transparent coating comprising a high Tg binder, void latex particles, hollow glass beads and calcined clay performs well in absorbing sound.

TABLE 3

Noise Reduction in a Ceiling Tile Coated With a Coating Comprising Void Latex Particles, Hollow Glass Beads and Calcined Clay.

| | eNRC | Air Flow Resistivity (Pa * s/m$^2$) | LR (Light Reflection) |
|---|---|---|---|
| 28 g 2 coats | 0.90 | 40,400 | 0.914 |
| 30 g 2 coats | 0.89 | 41,033 | 0.917 |
| 34 g 2 coats | 0.88 | 47,433 | 0.931 |

In some embodiments, the inventive acoustically transparent coating can be prepared with a mineral filler with a particle size distribution from 40 to 150 microns. Such mineral fillers may include calcium magnesium carbonate and/or silica dioxide (sand). One suitable calcium magnesium carbonate filler is available under the trade name DOLOFIL 4085 from Specialty Minerals, Inc. in Pennsylvania. Just like the void latex particles or hollow glass particles, solid mineral particles of 40 to 150 microns also create many tiny pores over the dried coating surface. When the sound energy reaches to the coating surface, the tiny pores trap and adsorb the sound energy and reduce the sound reflection back in the room. In some embodiments, a mineral filler can be used instead of hollow glass spheres and/or void latex particles. In other embodiments, a mineral filler can be used together with hollow glass spheres and/or void latex particles.

A suitable filler for ceiling tiles' coating is selected by considering many factors, including color, cost and raw materials safety.

As shown in Table 4 below, when a ceiling tile is coated with at least one coat of an acoustically transparent coating comprising a mineral filler with solid particles in the range from 40 to 150 microns, this coated tile performs well in noise reduction as all well in air flow resistivity and light reflection.

TABLE 4

Noise Reduction in a Ceiling Tile Coated With a Coating Comprising Solid Mineral Filler Particles and Calcined Clay.

| | eNRC | Air Flow Resistivity (Pa * s/m$^2$) | LR (Light Reflection) |
|---|---|---|---|
| 26 g 2 coats | 0.84 | 19,400 | 0.870 |
| 40 g 2 coats | 0.94 | 29,500 | 0.912 |
| 50 g 2 coats | 0.94 | 55,600 | 0.923 |

The present acoustically transparent coatings may further optionally comprise at least one foaming agent, biocide, thickener, water retention agent, dispersant, biocide, pigment and other additives.

The substrates to which the coating composition can be applied include ceiling tiles and other construction panels. Suitable ceiling tiles include fiberglass tiles and polymeric mats. The present acoustically transparent coating can be applied to any building construction substrate in order to create a surface with pores.

Any application method can be used to apply the coating composition to the substrate. Such application methods include, but are not limited to, spray coating, brush coating, dipping and roller coating.

In some embodiments, the coating composition can be applied to the surface of a construction product at a plant. For example, a fiberglass tile can be coated with the coating and then sold as a coated product. In other embodiments, the coating composition can be prepared and stored separately until applied at a construction site over tiles and/or other panels that have been installed prior to the application of the acoustically transparent coating composition.

A person of skill will readily recognize that the dried thickness of the applied coating may vary. In some embodiments, several applications of the coating composition may be needed to achieve sufficient noise reduction. Typically, the dried coating is at least about 200 microns thick. In some embodiments, the dried coating is from 200 microns to 350 microns thick.

The invention will be now described in more detail by the way of the following non-limiting examples.

Example 1

The following acoustically transparent coating formulations comprising a High Tg binder and void latex particles (formulations 1, 2 and 3) and hollow glass beads (formulation 4) were prepared and used for obtaining ceiling tiles with the eNRC value of at least 0.85 and higher.

Formulation 1.

| Ingredient | Amount (g) |
|---|---|
| Water | 400 |
| Cellulosic thickener | 0.8 |
| Water softener | 2.0 |
| Dispersant | 3.0 |
| Co-dispersant | 2.3 |
| Pigment 1 | 100 |
| Filler 1 | 100 |
| Pigment 2 | 125 |
| High Tg latex polymeric binder | 206 |
| Void latex particles | 69 |
| Filler 2 | 163 |
| Biocide | 2.0 |
| Defoamer | 4.0 |

Formulation 2.

| Ingredient | Amount (g) |
|---|---|
| Water | 400 |
| Cellulosic thickener | 0.8 |
| Water softener | 2.0 |
| Dispersant | 3.0 |
| Co-dispersant | 2.3 |
| Pigment 1 | 100 |
| Filler 1 | 100 |
| Pigment 2 | 125 |
| High Tg latex polymeric binder | 69 |
| Void latex particles | 206 |
| Filler 2 | 163 |
| Biocide | 2.0 |
| Defoamer | 4.0 |

Formulation 3.

| Ingredient | Amount (g) |
|---|---|
| Water | 400 |
| Cellulosic thickener | 0.8 |
| Water softener | 2.0 |
| Dispersant | 3.0 |
| Co-dispersant | 2.3 |
| Pigment 1 | 100 |
| Filler 1 | 100 |
| Pigment 2 | 125 |
| High Tg latex polymeric binder | 55 |
| Void latex particles | 220 |
| Filler 2 | 163 |
| Biocide | 2.0 |
| Defoamer | 4.0 |

Formulation 4.

| Ingredient | Amount (g) |
|---|---|
| Water | 400 |
| Cellulosic thickener | 0.8 |
| Water softener | 2.0 |
| Dispersant | 3.0 |
| Co-dispersant | 2.3 |
| Pigment 1 | 100 |
| Filler 1 | 100 |
| Pigment 2 | 77 |
| High Tg polymeric binder | 275 |
| Glass Beads K1 | 48 |
| Filler 2 | 163 |
| Biocide | 2.0 |
| Defoamer | 4.0 |

Example 2

The following acoustically transparent coating formulation comprising a binder (Tg from 30° C. to 150° C.) to and mineral filler calcium magnesium carbonate (DOLOFIL 4085 from Specialty Minerals, Inc.) was prepared and used for obtaining ceiling tiles with the eNRC value of at least 0.85 and higher.

Formulation 5.

| Ingredient | Amount (g) |
|---|---|
| Water | 400 |
| Cellulose thickener | 0.8 |
| Water softener | 2.0 |
| Dispersant | 3.0 |
| Co-dispersant | 2.3 |
| Pigment 1 | 100 |
| Filler 1 | 100 |
| Pigment 2 | 125 |
| Vinyl-Chloride-containing Acrylate Copolymer | 275 |
| Filler 2 | 163 |
| calcium magnesium carbonate | 165 |
| Biocide | 2.0 |
| Defoamer | 4.0 |

What is claimed is:

1. A coated ceiling tile with an estimated noise reduction coefficient (eNRC) of at least 0.85, the coated ceiling tile comprising at least two coats of a coating being coated on at least one surface of the ceiling tile, and wherein the coating has pores and the coating comprises at the time of application to the ceiling tile a high Tg polymeric binder in an amount from 5 wt % to 25 wt % of the solids content in the coating composition, said high Tg polymeric binder having a glass transition temperature (Tg) in the range from 60° C. to 150° C., titanium dioxide, and void latex particles in an amount from 25 wt % to 75 wt % of the solids content in the coating composition, said void latex particles comprising a water-filled or air-filled core surrounded by a shell which comprises a thermoplastic polymer with Tg in the range from 60° C. to 110° C., the void latex particles having a diameter from 100 nm to 500 nm.

2. The coated ceiling tile of claim 1, wherein the high Tg polymeric binder is selected from the group consisting of acrylate, vinyl acrylate, polyvinyl acetate, styrene acrylate and any mixture thereof.

3. The coated ceiling tile of claim 1, wherein the coating further comprises at least one filler selected from the group consisting of calcium carbonate, calcium magnesium carbonate, kaolin, synthetic kaolin, silica dioxide and any combination thereof.

4. The coated ceiling tile of claim 1, wherein the ceiling tile is selected from the group consisting of fiberglass tiles and mineral wool tiles.

\* \* \* \* \*